United States Patent
Beck et al.

(10) Patent No.: US 6,315,166 B1
(45) Date of Patent: Nov. 13, 2001

(54) DEVICE FOR STORING AND SQUEEZING OUT FREE-FLOWING COMPOSITIONS

(75) Inventors: Horst Beck, Dudenhofen; Michael Schaetzle, Walldorf, both of (DE)

(73) Assignee: Henkel Tenoson GmbH, Heidelberg (DE)

( * ) Notice: Subject to any disclaimer, the term of this patent is extended or adjusted under 35 U.S.C. 154(b) by 0 days.

(21) Appl. No.: 09/462,939

(22) PCT Filed: Jul. 7, 1998

(86) PCT No.: PCT/EP98/04208

§ 371 Date: May 5, 2000

§ 102(e) Date: May 5, 2000

(87) PCT Pub. No.: WO99/03571

PCT Pub. Date: Jan. 28, 1999

(30) Foreign Application Priority Data

Jul. 16, 1997 (DE) .............................................. 197 30 424

(51) Int. Cl.$^7$ ...................................................... B67D 5/00
(52) U.S. Cl. ...................... 222/137; 222/135; 222/145.1; 222/145.6; 222/386; 222/389
(58) Field of Search ..................................... 222/135, 137, 222/145.1, 145.5, 145.6, 386, 388, 389

(56) References Cited

U.S. PATENT DOCUMENTS

| | | | |
|---|---|---|---|
| 3,248,014 | * 4/1966 | Gill | 222/137 |
| 4,014,463 | * 3/1977 | Hermann | 222/135 |
| 4,029,236 | * 6/1977 | Carson, Jr. et al. | 222/135 |
| 4,334,787 | 6/1982 | Kluth et al. | 366/162 |
| 4,742,087 | 5/1988 | Kluth et al. | 521/107 |
| 4,857,623 | 8/1989 | Emmerling et al. | 528/28 |
| 4,964,541 | 10/1990 | Gueret | 222/137 |
| 4,986,443 | 1/1991 | Saur et al. | 222/1 |
| 5,558,116 | 9/1996 | Dubach | 137/101.11 |
| 5,589,145 | * 12/1996 | Kaufman | 422/292 |
| 5,747,581 | 5/1998 | Proebster et al. | 524/590 |
| 5,954,236 | * 9/1999 | Virnelson | 222/135 |

FOREIGN PATENT DOCUMENTS

| | | |
|---|---|---|
| 674 717 | 7/1990 | (CH) . |
| 27 26 911 | 12/1978 | (DE) . |
| 29 27 584 | 1/1981 | (DE) . |
| 36 26 223 | 2/1988 | (DE) . |
| 36 29 237 | 3/1988 | (DE) . |
| 41 19 484 | 12/1992 | (DE) . |
| 42 02 591 | 8/1993 | (DE) . |
| 0 351 358 | 3/1992 | (EP) . |
| 0 313 519 | 4/1998 | (EP) . |
| 2 086 248 | 5/1982 | (GB) . |
| WO95/00572 | 1/1995 | (WO) . |
| WO95/24556 | 9/1995 | (WO) . |
| WO95/27558 | 10/1995 | (WO) . |

* cited by examiner

Primary Examiner—J. Casimer Jacyna
(74) Attorney, Agent, or Firm—Wayne C. Jaeschke; Stephen D. Harper

(57) ABSTRACT

A device for expressing free-flowing compositions is presented having a cylindrical container (1) for accommodating a free-flowing component (2), two axially displaceable pistons (3) and (4) designed to close the cylindrical container, and a material outlet opening (5) at the lower end of the cylinder wall. The material outlet opening only releases the flow of the component (2) after the piston (4) has been moved past the material outlet opening into the end position (4') by the expressing pressure. The device can be used with a conventional applicator for one-component adhesives, sealants or coating materials to provide the addition of a second component.

7 Claims, 2 Drawing Sheets

DEVICE FOR STORING AND SQUEEZING OUT FREE-FLOWING COMPOSITIONS

BACKGROUND OF THE INVENTION

1. Field of the Invention

This application is filed under 35 U.S.C. 371 and based on PCT/EP98/04208, filed Jul. 7, 1998.

This invention relates to a device for storing, transporting and expressing free-flowing compositions, more particularly adhesives and sealants.

2. Discussion of Related Art

Whenever free-flowing compositions—whether of low or high viscosity—are to be stored or transported for a certain time, they have to be protected against flowing out, drying out or, in the case of reactive compositions (for example sealants and adhesives), against reacting out. Accordingly, the containers accommodating the free-flowing composition are closed and are only opened immediately before use. Opening generally involves a completely separate step. If the container filled with the reaction substance is part of a complex application system, opening of the container at the beginning of dosing is often a complicated step and mistakes can often be made.

In the case of reactive systems, such as adhesives and/or sealants for example, two or more components often have to be separately stored. The separate components are only supposed to come into contact with one another immediately before use and to be thoroughly mixed before they can be applied and react out. For the industrial-scale application of such two-component or multicomponent adhesives and/or sealants or coating materials, this problem has been solved by the installation of generally very expensive dosing and mixing systems. These systems generally enable the two-component or multicomponent compositions to be reliably and properly stored, dosed and correctly mixed.

In the small-user field, i.e. in small-scale production or, more particularly, in the hand-made field or among end users, the dosing and mixing systems referred to above are out of the question for the application of two-component and/or multicomponent compositions because they are too complicated and too expensive. Accordingly, users in these categories generally prefer one-component systems because they can be used with simple applicators without any risk of mixing or dosing errors that could adversely affect the end properties of the bond or seal or coating. In many cases, however, the reaction rate of one-component compositions is not sufficient to develop ultimate strength or a minimum strength so that conventional two-component compositions are still used in cases such these. Since, as mentioned above, elaborate mixing and dosing systems cannot be used here, other approaches have been adopted to reduce the effects of possible mixing errors. In these conventional two-component and multicomponent compositions, the two components generally have equally large volumes and viscosities. However, this means that special two-component application systems are still needed for such two-component compositions. Examples of such two-component systems are coaxial cartridges surmounted by a static mixer of the type marketed, for example, under the name of "Supermix" by Liquid Control. In addition, two-component systems with two parallel cartridges and a dynamic mixing head are known, for example, from EP-B-313 519 and EP-B-351358. DE-A-4202591 describes a process for premixing at least two pastes before introduction into a mixer in which the strands of paste delivered to the mixer form thin adjoining layers. DE-C-2927584 describes an arrangement for dosing two-component products in a predetermined mixing ratio using a piston-and-cylinder assembly in which two cylinders are arranged axially one behind the other. By means of a special mechanism, the two pistons situated between the two chambers can be simultaneously displaced in opposite directions, the component from the rear chamber being guided through a component line leading centrally through the pistons and the front chamber to the front end where a mixing unit is arranged. All these two-component systems require special devices or applicators for their use.

In practice, it is desirable to be able to apply such multicomponent compositions by standard application systems. WO 95/24556 describes a dosing attachment for a cartridge designed to be emptied by means of a press. This dosing attachment contains a mixing component and a dosing chamber with a gear pump driven by two rotors. The main component is accommodated in the cartridge and, when it is squeezed out, drives the gear pump via the rotors so that, with this dosing attachment, at least two components can be mixed together in dosed form by means of a standard cartridge press. The disadvantage of this arrangement is that the dosing attachment contains mechanically moved parts and, in addition, the reactive components are combined in the mixing chamber itself by means of the gear pump so that reactive systems continue to react in the dosing chamber in the event of operational interruptions. This gives rise to serious problems through hardening when work is resumed.

WO 95/127558 describes a process and an arrangement for combining at least two flowable media. In a preferred embodiment, the first (main) medium is accommodated in a standard cartridge. The second chamber containing the second flowable medium is accommodated in an attachment designed to be fitted to the cartridge. This chamber communicates with the flow region and/or with the first chamber through at least one opening element for branching off part of the first flowable medium from the first chamber into the second chamber. The second chamber contains a displaceable separating element which separates the first medium from the second medium and which is moved in the common opening direction by the first medium entering the second chamber so that the second flowable medium is pressed out from the chamber accommodated in the attachment. Although this arrangement gives useful results in many cases, it has been found in practice that serious leakage problems can occur at the inlet and outlet openings, particularly in the case of low-viscosity second media. These are major disadvantages, particularly in the event of prolonged storage of reactive systems and in the event of brief interruptions in application.

Accordingly, the problem addressed by the present invention was to provide a device for expressing flowable compositions which would only release the flow of at least one component under the effect of the expressing pressure applied thereto. More particularly, the problem addressed by the invention was to provide a device for the spatially separate and synchronous expression of two or more free-flowing components, more particularly sealants and adhesives. Preferably, these devices would be able to be used with conventional, widely marketed applicators for one-component adhesives/sealants.

DESCRIPTION OF THE INVENTION

The solution provided by the invention is defined in the claims and lies essentially in the provision of a device for expressing free-flowing compositions consisting of a cylindrical container for accommodating the free-flowing component which is designed to be closed by two axially displaceable pistons and which, at the lower end of the cylinder wall, comprises a material outlet opening which only releases the flow of the free-flowing component after the lower piston has been moved past the material outlet opening into the end position by the expressing pressure.

A preferred embodiment of the invention relates to a device for the spatially separate and synchronous expression of two or more free-flowing components which comprises at least one cylindrical container of the above-mentioned type.

During storage and transportation, at least one of the free-flowing components is accommodated in a cylindrical container with two displaceable pistons. For application, pressure is applied to one of the two pistons so that both pistons—together with the free-flowing component—are moved forward towards the outlet opening in the cylindrical container. After the lower piston—which was originally situated closer to the outlet opening—has passed that outlet opening and has thus released the flow of the free-flowing component, it is prevented from moving any further by a stop disposed on the cylindrical container so that, when further pressure is applied to the upper piston, the free-flowing component is able to flow out of the container. The amount of free-flowing component delivered from the container per unit of time can be suitably influenced by the diameter of the outlet opening, by the expressing pressure applied to the upper piston and by the viscosity of the free-flowing component.

This principle can be applied to numerous packaging systems. A particularly preferred embodiment are cartridges for two-component or multicomponent reactive systems such as, for example, sealants and/or adhesives or coating materials. The triggering pressure for activating/opening the container with the two axially displaceable pistons can be generated in various ways:

mechanically and directly, for example via the advancing piston of a cartridge gun or other drive, mechanically and indirectly, for example via a screwthreaded spindle which drives a distance piece forwards, via a free-flowing component itself under pressure where the container with the two axially displaceable pistons is accommodated in another outer container through which the free-flowing component flows, the pressure on the piston being controllable through a preliminary distribution of material.

Preferred examples of the free-flowing components are reactive adhesives and/or sealants or coating materials as the basic component. The second andlor other free-flowing component may be a catalyst composition, a color component or a reactive crosslinking agent or a combination thereof.

One particularly advantageous embodiment of the device according to the invention is characterized in that at least one cylindrical container with the two axially displaceable pistons and the material outlet opening is in the form of an adapter which is fitted to a commercially available cartridge as a second container. The cylindrical container of the adapter may thus be filled with a small amount of a catalyst and/or crosslinking and/or color component and is designed in such a way that the volumetric flow of the basic component of the adhesive/sealant squeezed out from the cartridge drives the displaceable piston facing this stream of material forwards and hence squeezes out the small amount of the catalyst and/or crosslinking and/or color component. The two components are continuously mixed and the resulting mixture is uniformly discharged through a nozzle optionally screwed onto the adapter. The intermixing of the two components can be further completed by a static mixer fitted to the adapter. Basically, any form of two-component adhesives/sealants or coating materials where the two components have to be mixed before application may be used for the process according to the invention. In one particularly preferred embodiment, the main component is a one-component moisture-curing system to which a second component is added as hardener, catalyst or color component or optionally a combination thereof. This basic system may be based, for example, on polyurethane adhesives/sealants containing reactive isocyanate groups although the basic adhesive/sealant may also be based on polydimethyl siloxanes, alkoxysilane-terminated prepolymers or on polymers containing reactive epoxide groups. Particularly suitable polyurethane adhesives/sealants are described, for example, in Example 3 of WO 95/100572. Suitable adhesives/sealants based on alkoxysilane-terminated polyethers are described in detail in DE-C-4119484, the fluorine surfactants described therein not necessarily having to be part of the adhesives/sealants to be used in accordance with the invention. Suitable alkoxysilane-terminated polyurethanes are described, for example, in DE-A-36 29 237.

The catalyst component is determined by the basic adhesive/sealant used; the organometallic compounds known in polyurethane chemistry, for example iron or tin compounds, may be used for polyurethanes and include, for example, 1,3-dicarbonyl compounds of iron or divalent or tetravalent tin, but especially the Sn(II) carboxylates or the dialkyl Sn(IV) dicarboxylates or the corresponding dialkoxylates such as, for example, dibutyl tin dilaurate, dibutyl tin diacetate, dibutyl tin dibutylate, dioctyl tin diacetate, dibutyl tin maleate, tin(II) octoate. In addition, the highly active tertiary amines or amidines may be used as catalysts, optionally in combination with the above-mentioned tin compounds. Suitable amines are both acyclic and in particular cyclic compounds such as, for example, tetramethyl butanediamine, bis(dimethylaminoethyl)ether, 1,4-diazabicyclooctane, 1,8-diazabicyclo(5.4.0)undecene, 2,2'-dimorpholino-diethylether or dimethyl piperazine or even mixtures of the above-mentioned amines.

If the basic adhesive/sealant formulation is based on alkoxysilaneterminated prepolymers, the tin compounds mentioned above may be used. However, preferred amine catalysts are long-chain aliphatic amines.

Suitable crosslinking components are organic diamines and triamines such as, for example, ethylenediamine, propylenediamine, 1,4-diaminobutane, diethylenetriamine or piperazine and optionally low molecular weight amino-terminated polyethers of the "Jeffamine" type. Suitable polyol crosslinkers are, in principle, any of the polyols known from polyurethane chemistry, more particularly low molecular weight polyether diols and triols, polyester polyols, polyols based on ε-caprolactone (also known as "polycaprolactones"). However, polyester polyols of oleochemical origin are particularly preferred. Polyester polyols such as these may be obtained, for example, by complete ring opening of epoxidized triglycerides of an at least partly olefinically unsaturated fatty acid-containing fatty mixture with one or more alcohols containing 1 to 12 carbon atoms and subsequent partial transesterification of the triglyceride derivatives to alkyl polyester polyols containing 1 to 12 carbon atoms in the alkyl moiety (see, for example DE-A-3626223). Other suitable polyols are polycarbonate polyols and dimer diols (Henkel) and, in particular, castor oil and derivatives thereof. This crosslinking component may optionally contain other low molecular weight compounds containing available hydrogen such as, for example, ethylene glycol, glycerol, aminoalcohols or water.

The low molecular weight silane crosslinkers known in silane chemistry may be used as crosslinker component for alkoxysilane-terminated prepolymer systems and for adhesives/sealants based on polydimethyl siloxanes.

The diamines and polyamines mentioned above may be used for adhesive/sealant systems based on polymers containing reactive epoxide groups.

Although liquid crosslinkers or catalysts can be directly used, it may be appropriate to replace them with inert solvents and/or plasticizers and optionally to adapt the viscosity of the solutions with thickeners to the viscosity of the basic adhesive/sealant. Highly disperse silicas, bentones, cellulose derivatives and similar flow aids are mentioned by way of example in this regard.

In another embodiment of the invention, a color component may be added via the adapter which simplifies storage for the user because he need only keep supplies of a single adhesivesealant of one basic color (for example colorless or white) and can adapt the color component to his own requirements. In vehicle construction, it may be, for example, the lacquer used for the vehicle.

The catalyst and/or crosslinker and color component may also be combined in a single paste.

As mentioned above, the catalyst, crosslinker and/or color component—in particularly preferred embodiments—may generally be used in small quantities in relation to the basic component so that the adapter need only be of small volume. This component is preferably used in a quantity of 0.5 to 10% by weight, based on the basic component. However, the two components may also readily be used in equal parts by weight and volume; the device should be adapted to the particular ratio between the components to be combined. This may advantageously be done by adapting the container volumes, through the level to which they are filled with the components and/or by adapting the cross-section of the material outlet opening(s).

The invention is illustrated by the following Example.

EXAMPLE

The adapter according to the invention shown in FIG. 2 was screwed onto the cartridge of a commercially available one-component moisture-curing one-component polyurethane adhesive/sealant (Terostat 8590, a product of Henkel Teroson) and 5 ml of an aqueous solution thickened with PUR thickener were introduced into the adapter. The adhesive/sealant-crosslinker mixture was applied to aluminium angles by a commercially available cartridge gun. The aluminium angles had been precoated with a polyurethane primer (Terostat 8510, a product of Henkel Teroson) and aired for 15 minutes. The aluminium angles were then fitted together so that a 5 mm thick glueline was formed. 60 minutes after assembly, the bond was tested for tensile strength. An average tensile strength of about 1.5 N/mm$^2$ (average of 9 measurements) was obtained. The Shore A hardness after this time was already 38. A Shore A hardness of ca. 50 is achieved in the final state.

In a comparison test, the adhesive/sealant was similarly applied to the aluminium angles with no crosslinker or adapter and then tested for ensile strength. After 60 minutes, a tensile strength of 0.15 N/mm$^2$ was measured.

Compared with the adapter disclosed in WO95/127558, the adapter according to the invention afforded the following advantages:

No leakage problems were encountered with the adapter according to the invention filled with crosslinker either during storage thereof or during application of the adhesive/sealant-crosslinker mixture using the cartridge gun whereas, with the adapter according to WO 95/27558, the crosslinker in particular escaped, even from the rear part of the adapter chamber, both during storage and in particular during application of the mixture.

In the event of interruptions in application, hardening occurred at the outlet for the crosslinker liquid through direct contact with the adhesive/sealant and caused significant problems when application was resumed; no such problems were observed with the adapter according to the invention.

Some preferred embodiments of the device according to the invention are shown in the accompanying drawings. The above-mentioned advantages and other advantages of the present invention will become clear from the following description of those embodiments. All the drawings are sectional side elevations. In the drawings:

FIG. 1 schematically illustrates one embodiment of the device according to the invention as claimed in claim 1.

Figure 1:
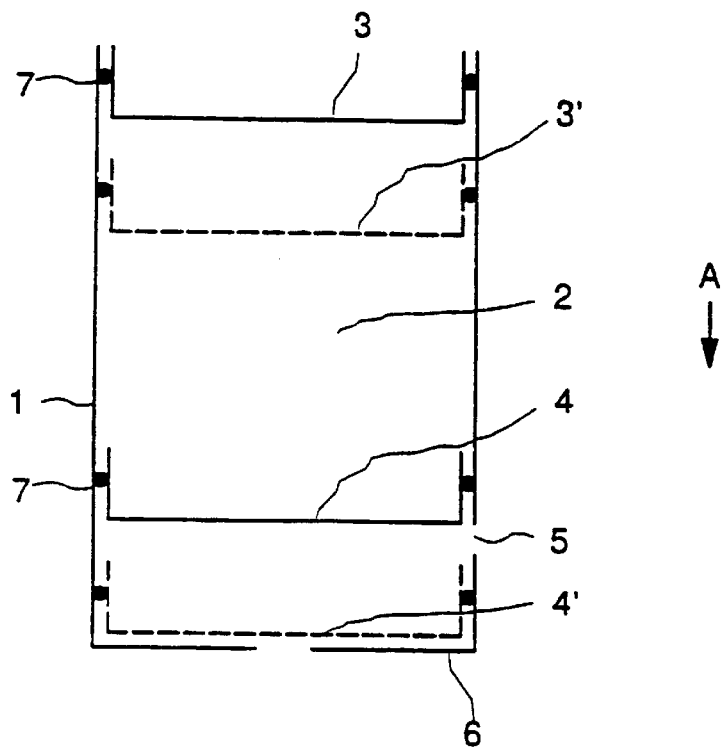

FIG. 1 shows one embodiment of a device according to the invention for expressing free-flowing compositions, more particularly adhesives and sealants. The cylindrical container 1 is used to accommodate the free-flowing component 2. The cylindrical container 1 is closed by two axially displaceable pistons 3 and 4. These pistons are designed in such a way that, on the one hand, they fit tightly into the cylinder and thus prevent low-viscosity free-flowing components 2 from leaking out; on the other hand, they are axially displaceable easily enough so that only a light pressure is required to displace the pistons 3 and 4. A sealing element 7 in the form of an O ring or even a sealing lip cast onto the piston may optionally be disposed between the piston and the cylinder wall.

To remove the free-flowing component 2, a pressure is applied to the piston 3 in the direction of the arrow A. The piston 3 is thus first moved into the position 3' and transports the piston 4 into the position 4' through the pressure applied to the free-flowing component. Under the effect of the stop 6, the piston 4 is held in the position 4' and cannot be moved any further. In this position, the material outlet opening 5 is uncovered so that, under the effect of further pressure on the piston 3, the free-flowing component 2 is able to flow out through this material outlet opening. This expression of the free-flowing composition 2 from the cylindrical container takes place under the effect of the further pressure in direction A, the piston 3 continuing to move towards the material outlet opening. A nozzle, a flow passage diverting the flow of material, for example in the form of a standard cartridge tip, may optionally be disposed at the material outlet opening. These special embodiments are not shown in FIG. 1.

Figure 2:
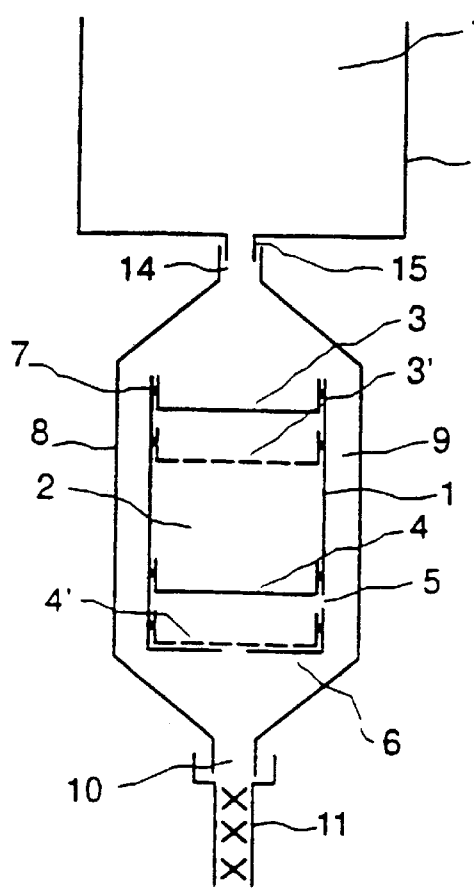
FIG. 2 illustrates the embodiment claimed in claims 2 and 3 with a container according to FIG. 1 built into an adapter.

FIG. 2 shows a device for the spatially separate and synchronous expression of two free-flowing components 2 and 13, a cylindrical container 1 according to FIG. 1 being disposed in another cylindrical container 8 (adapter). The container 8 communicates with the material outlet opening 15 of the container 12 through its material inlet opening 14. FIG. 2 shows only the lower part of the container 12 in highly schematic form. The container in question is generally a commercially available cartridge for adhesives and/or sealants. Such cartridges generally have an external screwthread at the removal opening 15 so that, providing the material inlet opening 14 of the adapter 8 is correspondingly formed with an internal screwthread, the adapter 8 can be fixedly connected to the cartridge 12 simply by screwing on. However, the two containers 8 and 12 may be joined by other mechanisms, for example bayonet couplings, plain flanges with cap nuts, push-fit couplings with mechanical locks and the like.

The container 1 is arranged in the adapter chamber 8 in such a way that the second free-flowing component 13 can be pressed from the forward container 12 through the concentric interstice 9 into the container 8 and is transported through the interstice towards the outlet opening 10 of the adapter 8. During the removal phase, the expressing pressure of the second free-flowing component 13 experts a pressure on the piston 3 so that the pistons 3 and 4 move into the positions 3' and 4' in the manner already described. In one particularly preferred embodiment, a distributor head is fitted to the inner container. When the container 8 is screwed onto the cartridge 12, the distributor head advances the two pistons 3 and 4 into their end positions 3' and 4'. In addition, the distributor head can be designed in such a way that a suitable pressure difference can be built up between the materials in the container 8 and the interstice 9. The distributor head is not shown in FIG. 2. Through the uncovering of the outlet opening 5, the component 2 comes into contact at the material outlet opening 5 with the component 13 present in the interstice 9 and is discharged with it through the outlet opening 10 and a static mixer 11 optionally disposed thereon. A static mixer 11 (shown in part only) can provide for complete intermixing of the two free-flowing components should this be necessary.

Figure 3:
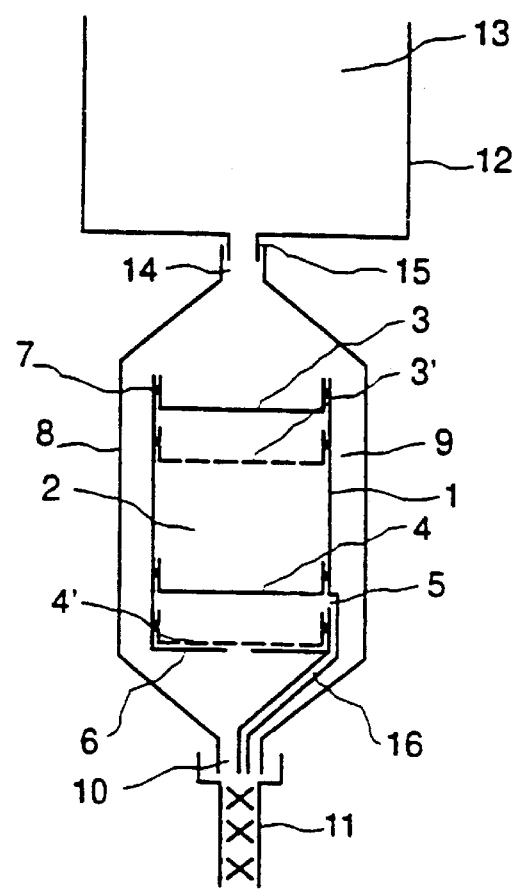
FIG. 3 shows another embodiment similar to that shown in FIG. 2 but with the flow of the second component guided in a different way.

FIG. 3 shows another embodiment of the device according to the invention. This embodiment differs from that shown in FIG. 2 in the fact that the material outlet opening 5 opens into a tubular passage 16 which ensures that the component 2 only comes into contact with the component 13 at the material outlet opening 10. This can be of advantage in the case of highly reactive systems, particularly where these two-component materials have to be applied with frequent interruptions because there is virtually no hardening of material at the point where the components are combined. Any hardening of material that has started in the static mixer 11 can easily be overcome by removing and cleaning the static mixer 11 or replacing it by a new disposable static mixer.

Figure 4:
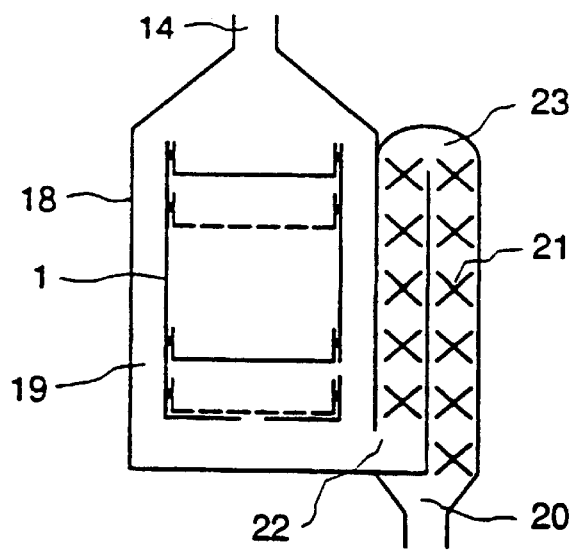
FIG. 4 shows another embodiment similar to that shown in FIG. 2 but with the flow of material guided in a different way and a different arrangement of the static mixer.

FIG. 4 shows another embodiment of a container 18 which comprises a container 1 of the type described above with the axially displaceable pistons and which may also be connected (not shown) via the material inlet opening 14 to another container in the manner illustrated in FIGS. 2 and 3. The concentric interstice 19 corresponds to the concentric interstice 9 in FIGS. 2 and 3 and is used to transport the free-flowing component. The main difference in relation to the embodiment shown in FIGS. 2 and 3 is the lateral arrangement of the static mixer 21 which is deflected in its delivery direction at 23. The common component streams 2 and 13 enter the static mixer at 22 and are homogeneously intermixed therein. An application nozzle for forming/shaping the component may optionally adjoin the outlet end 20 of the static mixer. The action principle on which the two components are combined in the device shown in FIG. 4 is exactly the same as in the device shown in FIG. 2. In the embodiment shown in FIG. 4, the component 2 may also be diverted through a tubular passage so that the two free-flowing components only come into contact in the inlet zone 22 (not shown in FIG. 4).

Figure 5:
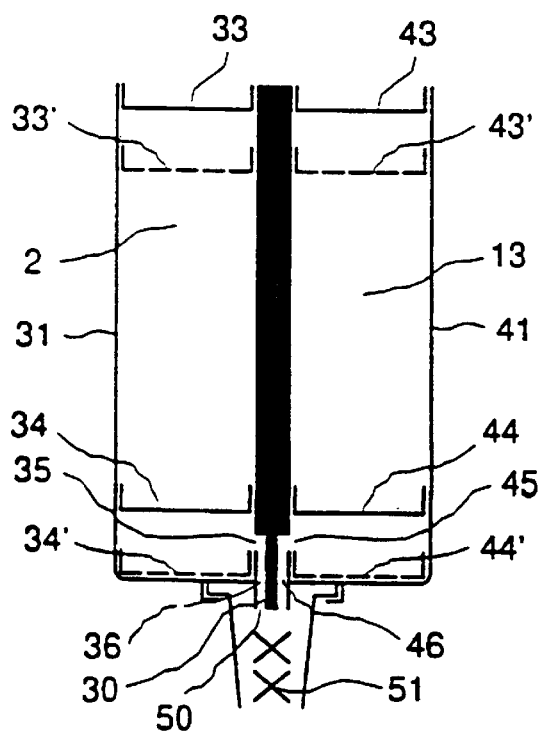
FIG. 5 shows an embodiment with two containers having substantially the same holding capacity arranged beside one another.

FIG. 5 shows another embodiment of the device according to the invention. Here, two containers 31 and 41 both containing two axially displaceable pistons 33,43 and 34,44 are disposed beside one another. In complete analogy to the principle illustrated above, the axially displaceable pistons 33,43 and 34,44 are moved into the positions 33',43' and 34',44' after the application of expressing pressure to the pistons 33 and 43. At the same time, the two material outlet openings 35 and 45 are uncovered. The effect of the partition 30 is that two passages 36 and 46 are formed so that the two components 2 and 13 only enter into contact with one another at the common material outlet opening 50. Here, the two materials may either be co-extruded as adjacent strands or may optionally be passed through a static mixer 51 which intermixes the components.

Embodiments of the device shown in FIG. 5 where the volumes for the components 2 and 13 are different are also possible. This can be achieved either through different cross-sections of the chambers accommodating the materials 2 and 13, in which case the feed paths 33 and 43 of the two pistons would be of equal length. Where the two chambers 31 and 41 have the same cross-section but different volumes, the different feed paths then necessary for the pistons 33 and 43 can be achieved either through different dimensions of the material outlet openings 35 and 45 or the passages 36 and 46. However, the mechanism by which the pistons 33 and 43 are advanced may also be designed in such a way that correspondingly adapted, different forward movement paths are established.

What is claimed is:

1. A device for expressing free-flowing compositions comprising:
    a) a cylindrical container (1) for accommodating a free-flowing component (2);
    b) two axially, independently, displaceable pistons (3) and (4) designed to close said cylindrical container; and
    c) a material outlet opening (5) at the lower end of the cylinder wall,
wherein said maternal outlet opening (5) only releases the flow of said component (2) after said piston (4) bas been moved past the material outlet opening into the end position (4') by an expressing pressure.

2. A device for the spatially separate and synchronous expression of two or more free-flowing components characterized in that it comprises at least one cylindrical container according to claim 1.

3. The device of claim 2 comprising said container (1) disposed in a larger container (8), wherein when a second free-flowing component (13) is pressed from a storage container (12) into the container (8), said second component (13) is delivered through a concentric interstice (9) to an opening (10), and at the same time said second component (13) axially displaces said pistons (3) and (4) so that said free-flowing component (2) flows out through said opening (5) and comes into contact with said second component (13) in the interstice (9).

4. The device of claim 3 further comprising a static mixer (11) fitted onto said opening (10), in which components (2) and (13) are extensively intermixed.

5. The device of claim 2 wherein said free-flowing components comprise as a first component an adhesive, sealant, or coating material, and as a second component a catalyst, color component, reactive crosslinking agent, or a mixture thereof.

6. The device of claim 1 wherein said container (1) is disposed in a larger container (18) comprising a laterally arranged static mixer (21).

7. The device of claim 1 comprising:

a) two cylindrical containers (31) and (41) arranged beside one another and accommodating said free-flowing components (2) and (13);

b) the device of claim 6 disposed within each of the cylindrical containers (31) and (41);

c) openings (35) and (45) at the lower ends of cylindrical containers (31) and (41) facing one another and which open into passages (36) and (46), wherein said passages are separated by a wall (30) so that said components (2) and (13) only come into contact with one another in a common opening region (50) or in a fitted mixer (51).

* * * * *

UNITED STATES PATENT AND TRADEMARK OFFICE
CERTIFICATE OF CORRECTION

PATENT NO.    : 6,315,166 B1
DATED         : November 13, 2001
INVENTOR(S)   : Beck et al.

It is certified that error appears in the above-identified patent and that said Letters Patent is hereby corrected as shown below:

<u>Title page,</u>
Item [73], Assignee, delete "Henkel Tenoson", and insert therefor
-- Henkel-Teroson --.

<u>Column 8,</u>
Line 46, delete "bas", insert therefor -- has --.

Signed and Sealed this

Seventeenth Day of June, 2003

JAMES E. ROGAN
*Director of the United States Patent and Trademark Office*